US006600578B1

United States Patent
Huang

(10) Patent No.: US 6,600,578 B1
(45) Date of Patent: Jul. 29, 2003

(54) BI-DIRECTIONAL TRANSMISSION MECHANISM AND METHOD FOR AN IMAGE SCANNER

(75) Inventor: Yin-Chun Huang, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/468,528

(22) Filed: Dec. 21, 1999

(51) Int. Cl.⁷ .................................................. H04N 1/04
(52) U.S. Cl. ...................... 358/474; 358/474; 358/296; 358/472; 358/497; 358/483; 358/473; 358/476; 358/494; 358/498; 358/482
(58) Field of Search ................................ 358/474, 296, 358/472, 497, 483, 473, 476, 494, 498, 482

(56) References Cited

U.S. PATENT DOCUMENTS

| | | | | |
|---|---|---|---|---|
| 5,049,999 A | * | 9/1991 | Stemmle | 358/296 |
| 5,647,274 A | * | 7/1997 | Yasuda et al. | 101/126 |
| 5,717,500 A | * | 2/1998 | Ikeda et al. | 358/449 |

* cited by examiner

*Primary Examiner*—Edward Coles
*Assistant Examiner*—Heather D Gibbs
(74) *Attorney, Agent, or Firm*—Stroock & Stroock & Lavan LLP

(57) ABSTRACT

A bi-directional transmission mechanism is provided for an image scanner to increase the scanning speed. The bidirectional transmission mechanism provides a first transmission device for driving a sheet table in a first direction, and a second transmission device disposed below the sheet table for driving an image reading device in a second direction. The two transmission devices are moving towards opposite directions and at the same time when the scanning operation is enabled. The present invention mainly encompasses a sheet table for placing a document sheet. A first transmission device is provided for supporting and connecting to the sheet table for driving the sheet table from a first direction to a second direction. An image reading device disposed under the sheet table reads the image information of the document sheet. And a second transmission device disposed in parallel to the first transmission device is provided for supporting and driving the image reading device from the second direction to the first direction at the same time when the scanning operation is enabled. Since the two transmission devices are moving towards each other, the scanning speed will be at least doubled if they are driven by step motors of the same speed.

13 Claims, 4 Drawing Sheets

BI-DIRECTIONAL TRANSMISSION MECHANISM AND METHOD FOR AN IMAGE SCANNER

BACKGROUND OF THE INVENTION

A. Field of the Invention

The present invention relates to a transmission mechanism and method for an image scanner, especially to an image scanner having a moveable document sheet table and a moveable image reading device for being driven in opposite directions at the time when capturing the image of a document sheet, thereby to increase the speed of scanning.

B. Description of the Prior Art

Conventional image scanners have been designed with various transmission mechanisms for the concern of image quality control, including the single-carriage transmission mechanism, the double-carriage transmission mechanism, or the paper-driven transmission mechanism. In general, these transmission mechanisms are driven by step motors for reading the image information of an original linearly and step by step. Refer to FIG. 1 for showing an example of a conventional single-carriage transmission mechanism for a flatbed scanner. The sheet table 12 is fixed on top of the housing for placing a document sheet. An image reading device 13 is driven along the sheet table 12 by a transmission device 11. Thus, the image information of the document sheet can be read progressively while the image reading device 13 is driven along the sheet table 12 by the step motor.

Refer to FIG. 2 for showing the image scanners of the paper-driven type. The image reading device 21 is fixed in the housing 22. The paper feeder (not shown) can drive the document sheet 23 progressively through top of the image reading device 21 for allowing the image reading device 21 to capture the image information therefrom. The similarity between these two types of transmission mechanisms is that only one element is moving at a time. Since the transmission mechanisms of these scanners are controlled by step motors, therefore the scanning speed is limited by the speed of the step motors.

To increase the scanning speed, an approach is using a high-speed step motor to increase the transmission speed and thus reduce the scanning time. However, the speed of the existing step motor is still slower than the speed of the image reading. So, up scaling the speed of a step motor can improve very little on the scanning speed.

SUMMARY OF THE INVENTION

Accordingly, it is an object of the present invention to provide a new transmission mechanism which can efficiently increase the scanning speed by providing a bidirectional transmission mechanism to drive a sheet table and an image reading device in opposite directions and at the same time.

It is another object of the present invention to improve the scanning efficiency based on the well-developed step motor technology and transmission mechanism.

In accordance with the present invention, the present invention provides a bidirectional transmission mechanism for an image scanner. The bi-directional transmission mechanism provides a first transmission device for driving a sheet table in a first direction, and a second transmission device disposed below the sheet table for driving an image reading device in a second direction. The two transmission devices are moving towards opposite directions and at the same time when the scanning operation is enabled. Since these two transmission devices are moving towards each other, the scanning speed will be at least doubled if they are driven by step motors of the same speed.

The present invention mainly encompasses a sheet table for placing a document sheet. A first transmission device is provided for supporting and connecting to the sheet table for driving the sheet table from a first direction to a second direction. An image reading device disposed under the sheet table reads the image information of the document sheet. And a second transmission device disposed in parallel to the first transmission device is provided for supporting and driving the image reading device from the second direction to the first direction at the same time when the scanning operation is enabled.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Two preferred embodiments of the invention are described below. These embodiments are merely exemplary. Those skilled in the art will appreciate that changes can be made to the disclosed embodiment without departing from the spirit and scope of the invention.

Figure 1:
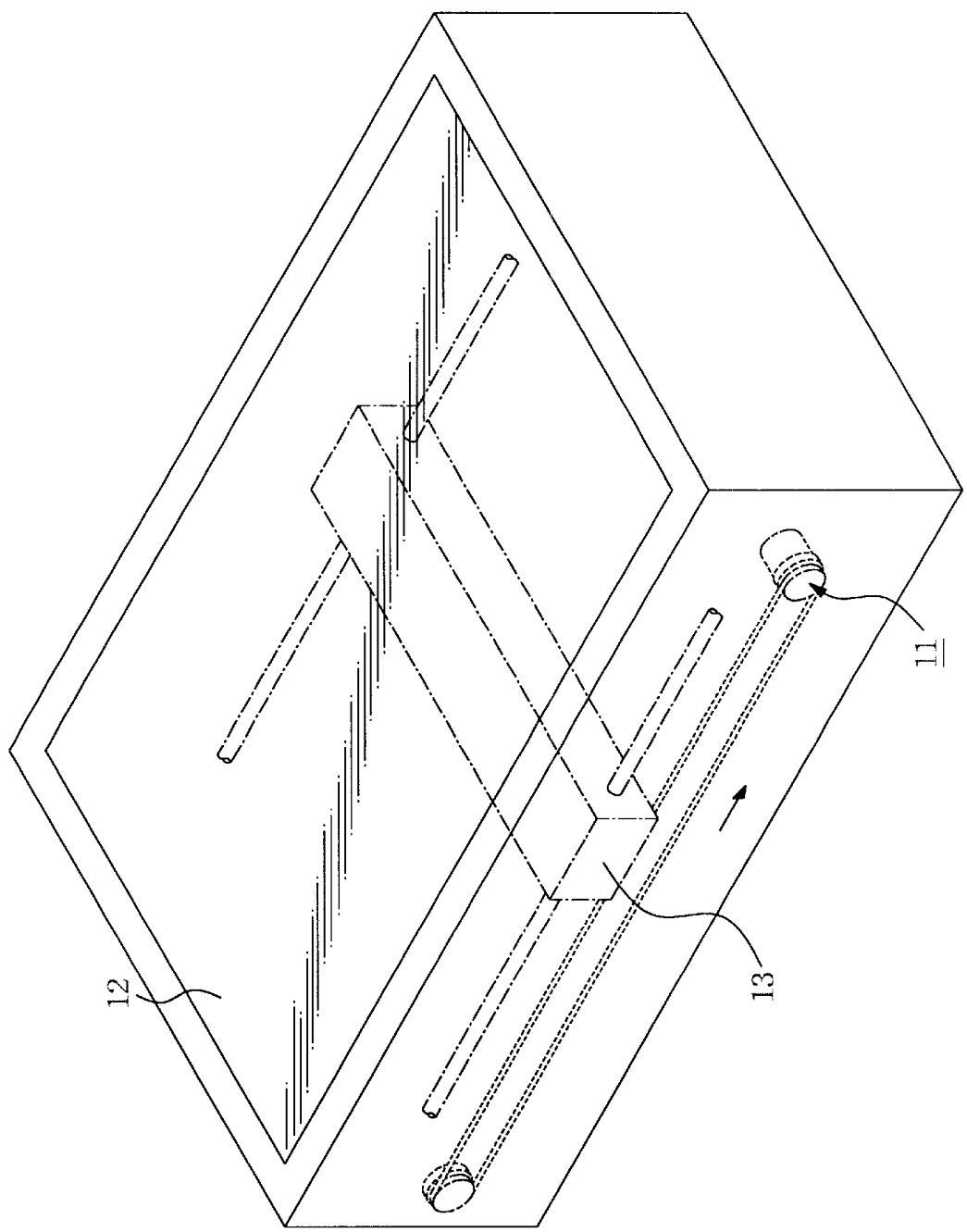
FIG. 1 is a schematic diagram showing the structure of a conventional flatbed scanner.
Figure 2:
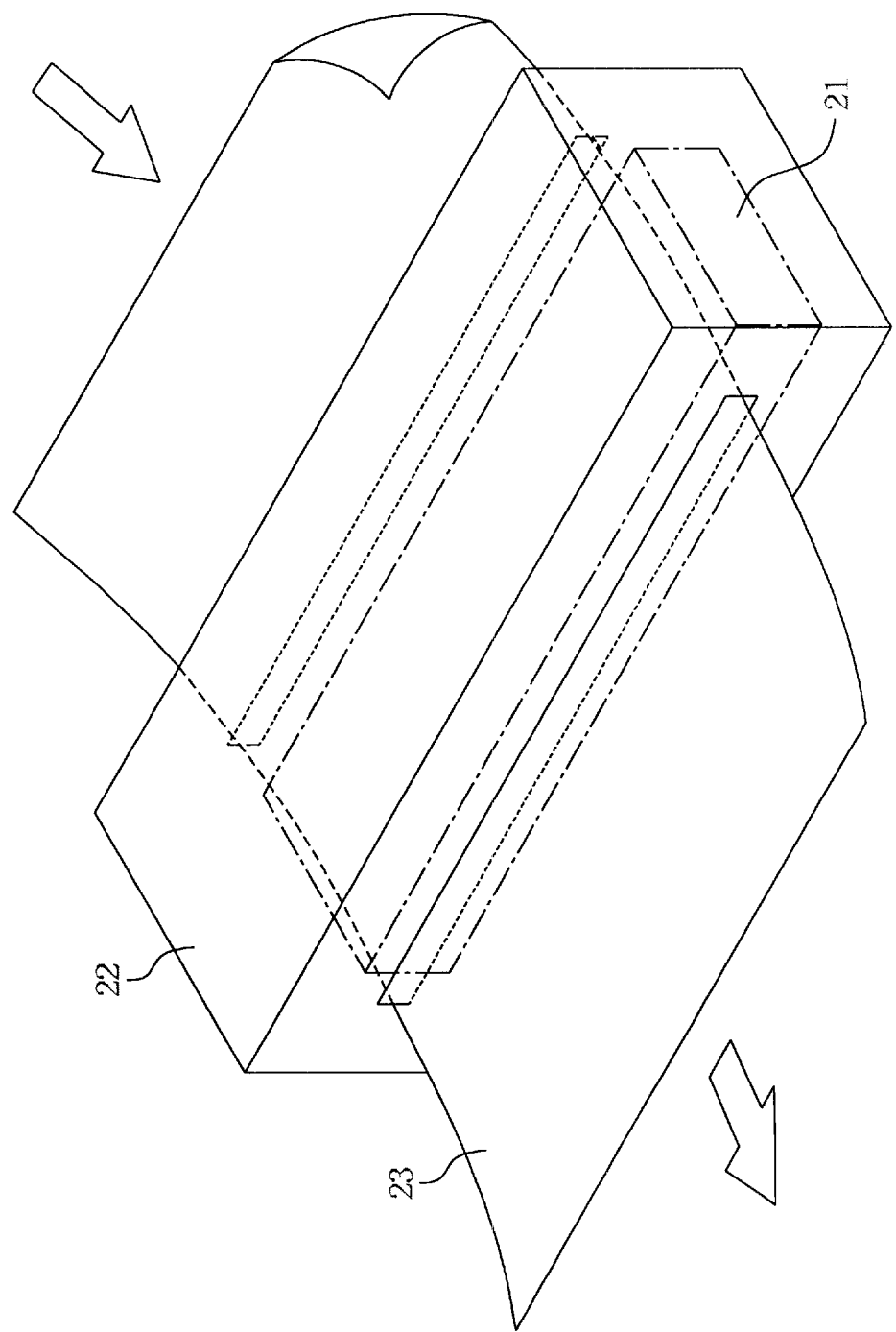
FIG. 2 is a schematic diagram showing the structure of a conventional paper-driven scanner.
Figure 3:
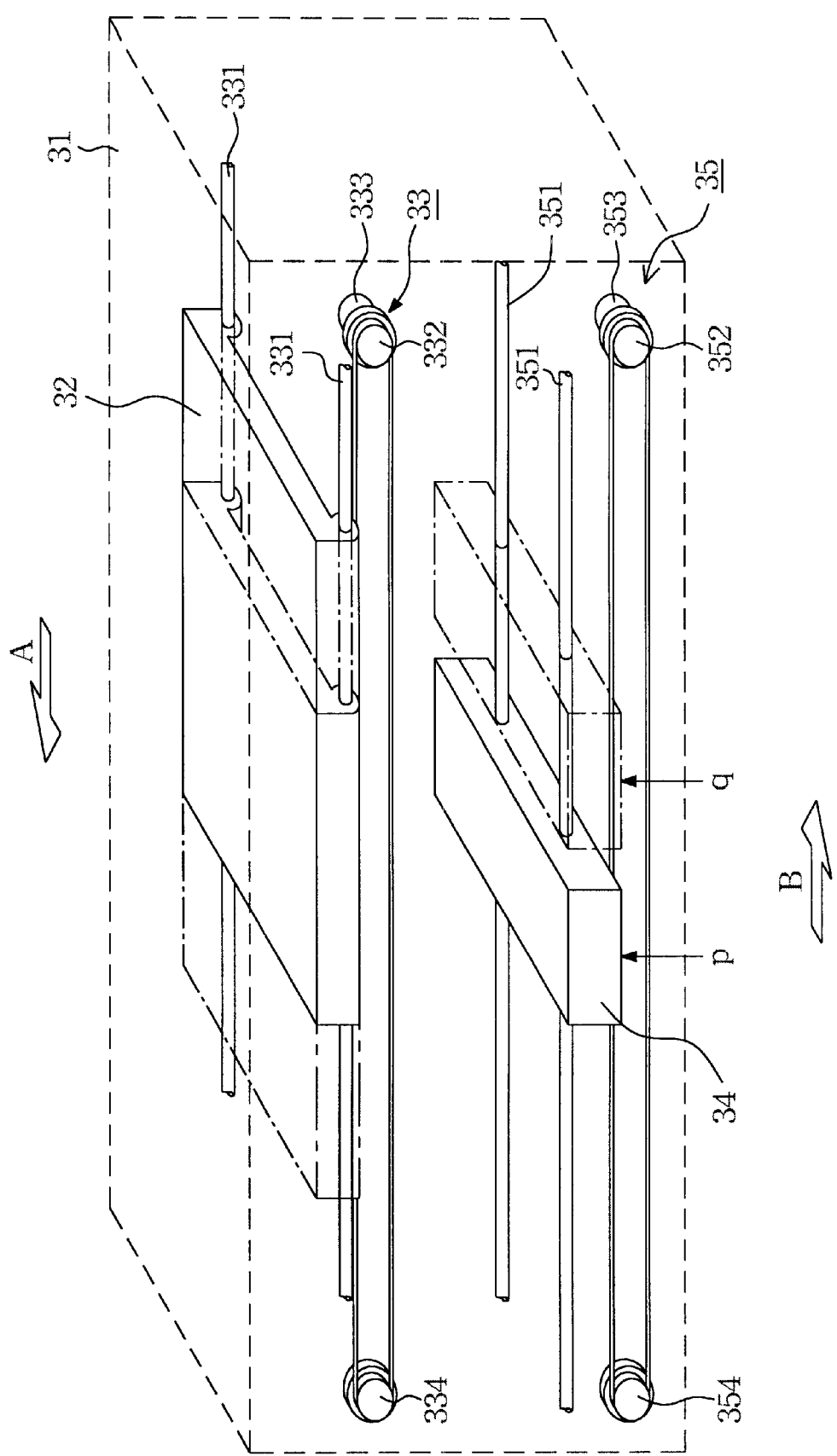
FIG. 3 is a perspective side view showing the structure of the bi-directional transmission mechanism for a flatbed scanner according to a preferred embodiment of the present invention.

Refer to FIG. 3 for showing the structure of the bi-directional transmission mechanism for an image scanner according to a preferred embodiment of the present invention. On top of the housing 31, there is a sheet table 32 for placing a document sheet. The sheet table 32 can be driven by a transmission device 33 to move back and forth reciprocally in a horizontal direction. The transmission device 33 comprises a pair of guiding shafts 331, a conveying element 332, a step motor 333, and a set of pulleys 334. The pair of guiding shafts 331 supports the sheet table 32 and allows the sheet table to move back and forth when conveyed by the conveying element 332. The pair of guiding shafts 331 can be implemented as slide shafts or leading screws. The step motor 333 controls the rotation and speed of the set of pulleys 334. As the set of pulleys 334 rotate, the conveying element 332 will be driven to move. Since the conveying element 332 is connected to the sheet table 32, so the movement of the conveying element 332 will drive the sheet table 32 to move back and forth reciprocally. The conveying element 332 can be implemented as a timing belt or a steel wire rope.

An image reading device 34 is disposed under the sheet table 32 for reading the image information of the document sheet. The image reading device 34 can be implemented as a contact image sensor or a charge coupled device. The image reading device 34 is driven by a second transmission device 35 to move back and forth reciprocally. The transmission device 35 comprises a pair of guiding shafts 351, a conveying element 352, a step motor 353, and a set of pulleys 354. The pair of guiding shafts 351 is disposed parallel to the guiding shafts 331 for supporting the image reading device 34. The pair of guiding shafts 351 can also be implemented as slide shafts or leading screws. The step motor 353 controls the rotation and speed of the set of pulleys 354. The set of pulleys 354 is connected to the conveying element 352 in a manner that when the set of pulleys rotates, it also drives the conveying element 352. Since the conveying element 352 is further connected to the image reading device 34, so the conveying element 352 will carry the image information device 34 along the sheet table 32. The conveying element 352 can be a timing belt or a steel wire rope.

When the image scanner is power on, the image reading device 34 is located at its initial position P and at one end of the sheet table 32. When the scanning procedure begins, the image reading device 34 is driven to move towards direction B while the sheet table 32 to move towards direction A at the same time. Thus, since they are moving towards each other, the scanning procedure will be finished as soon as the image reading device 34 arrives at point Q. The distance between P and Q will be less than half of the total length of the sheet table 32 if the two step motors are of the same speed. In that case, the scanning speed can at least be doubled.

A preferred embodiment has been described in detail hereinabove. It is to be understood that he scope of the invention also comprehends embodiments different from the one described, yet within the scope of the claims. For example, there are many variations in the transmission mechanisms in practical application as long as the two transmission devices are moving in opposite directions toward each other. The structure as illustrated in FIG. 4 shows another embodiment of the present invention which can also provide the same functions using the same approach.

Figure 4:
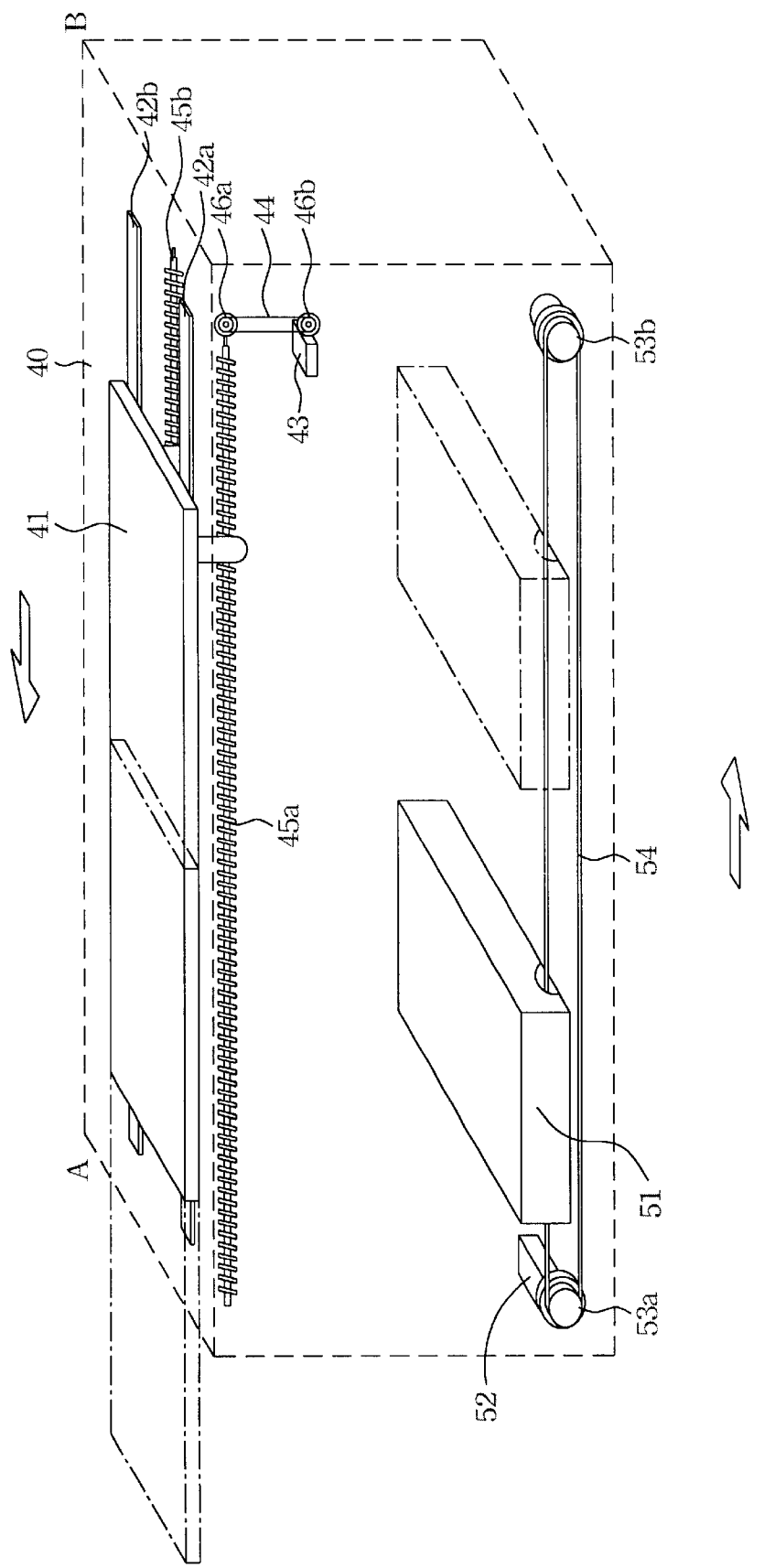
FIG. 4 is a perspective side view showing the structure of the bi-directional transmission mechanism for a flatbed scanner according to another preferred embodiment of the present invention.

As illustrated in FIG. 4, the sheet table 41 is disposed on top of the housing 40 and supported by a pair of guiding devices 42a, 42b. The sheet table 41 is connected to a pair of leading screws 45a, 45b to be driven back and forth reciprocally. The rotation of the pulleys 46b is controlled by the step motor 43. The conveying element 44 is connected to the pulleys 46a, 46b in a manner that when the pulleys 46a, 46b rotate, they also drive the leading screw 45a to rotate. Consequently, the rotation of the leading screw 45a, 45b drives the sheet table 41 to move forwards or backwards. The conveying element 44 can be implemented as a timing belt or a steel wire rope.

On the other hand, the image reading device 51 is disposed under the sheet table 41 and mounted on a pair of guiding shafts (not shown). The guiding shafts and slide shaft 42a, 42b are disposed in parallel for supporting the image reading device 51. When the scanning is proceeded, a document sheet is placed closed to one end of the sheet table 41 close to the side B. The image reading device 51 is located at the side A of the housing 40 and moving towards side B. The step motor 52 drives the pulleys 53a, 53b. The image reading device 51 will be driven towards direction B by the conveying element 54. Accordingly, the sheet table 41 and the image reading device 51 are moving towards each other simultaneously. After scanning, the image reading device 51 is driven to return to its initial position at side A while the sheet table 41 to its initial position near side B.

According to the bi-directional transmission mechanisms described above, the scanning speed can at least be doubled. If the speed of one step motor is two times faster than the other, then the total scanning speed can be increased to three times of the original speed. The computation for the speed increased is as follows: Let Vs represent the speed of the image reading device, $V_1$ be the speed of the sheet table, then the total speed V will be $V=Vs+V_1$.

According to this principle, the scanning speed can be efficiently improved. Moreover, since the speed of the step motor is much less than the speed of image capturing, so the image quality will not be influenced by the bi-directional transmission mechanism even if the speed of the step motor will be further increased in the future.

It should be understood that various alternatives to the structures described herein may be employed in practicing the present invention. It is intended that the following claims define the invention and that the structure within the scope of these claims and their equivalents be covered thereby.

What is claimed is:

1. A bi-directional transmission mechanism for an image scanner, comprising:

a sheet table for placing a document sheet;

first transmission means supporting and connecting to said sheet table for driving said sheet table from a first direction to a second direction, wherein said first direction is parallel to and opposite to said second direction;

image reading means disposed under said sheet table for reading the image information of said document sheet; and second transmission means disposed in parallel to said first transmission means for supporting and driving said image reading means from said second direction to said first direction at the same time when a scanning operation is enabled.

2. The bi-directional transmission mechanism as claimed in claim 1, wherein said first transmission means comprises:

a pair of guiding means for supporting said sheet table;

a set of pulleys;

a step motor connected to said set of pulleys for controlling the rotation and speed thereof; and a conveying element connected to said set of pulleys in a manner that said sheet table can be driven as said set of pulleys rotate.

3. The bidirectional transmission mechanism as claimed in claim 1, wherein said image reading means is a charge coupled device.

4. The bi-directional transmission mechanism as claimed in claim 1, wherein said image reading means is a contact image sensor.

5. The bi-directional transmission mechanism as claimed in claim 1, wherein said second transmission means comprises:

a pair of guiding means for supporting said image reading means;

a set of pulleys;

a step motor connected to said set of pulleys for controlling the rotation and speed thereof; and a conveying element connected to said set of pulleys in a manner that said image reading means can be driven as said set of pulleys rotate.

6. The bi-directional transmission mechanism as claimed in claim 2, wherein said pair of guiding means comprises:

at least a leading screw.

7. The bi-directional transmission mechanism as claimed in claim 2, wherein said pair of guiding means comprises:

at least a slide shaft.

8. The bi-directional transmission mechanism as claimed in claim 2, wherein said conveying element is a timing belt or a steel wire rope.

9. The bi-directional transmission mechanism as claimed in claim 5, wherein said guiding means comprises:

at least a leading screw.

10. The bi-directional transmission mechanism as claimed in claim 5, wherein said guiding means comprises:

at least a slide shaft.

11. The bi-directional transmission mechanism as claimed in claim 5, wherein said conveying element is a timing belt or a steel wire rope.

12. A bi-directional transmission method for an image scanner to capture the image information of a document sheet, comprising the steps of:

providing a sheet table for placing a document sheet, and said document sheet disposed close to an end of said sheet table for moving in a first direction;

providing an image reading means disposed below said sheet table and at an opposite end of said sheet table for reading the image information of said document sheet while being driven in a second direction; and driving said sheet table from said first direction to said second direction, and said image reading means from said second direction to said first direction simultaneously, wherein said first direction is parallel to and opposite to said second direction.

13. The method as claimed in claim 12, further comprising the step of:

returning said sheet table and said image reading means to their initial positions after finishing capturing the image information of said document sheet.

* * * * *